United States Patent
Yoshikawa et al.

(10) Patent No.: US 10,677,180 B2
(45) Date of Patent: Jun. 9, 2020

(54) CONTROLLER AND CONTROL METHOD FOR INTERNAL COMBUSTION ENGINE

(71) Applicant: TOYOTA JIDOSHA KABUSHIKI KAISHA, Toyota-shi (JP)

(72) Inventors: Yuya Yoshikawa, Anjo (JP); Isao Nakajima, Toyota (JP); Akihiro Katayama, Toyota (JP); Ryo Suzuki, Toyota (JP); Sohichi Imai, Toyota (JP); Eiichiro Kido, Okazaki (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 22 days.

(21) Appl. No.: 16/190,365

(22) Filed: Nov. 14, 2018

(65) Prior Publication Data

US 2019/0170072 A1 Jun. 6, 2019

(30) Foreign Application Priority Data

Dec. 6, 2017 (JP) ................................. 2017-234532

(51) Int. Cl.
*F02M 41/00* (2006.01)
*F02D 41/00* (2006.01)
(Continued)

(52) U.S. Cl.
CPC ....... *F02D 41/008* (2013.01); *F02D 41/1408* (2013.01); *F02D 41/1475* (2013.01);
(Continued)

(58) Field of Classification Search
CPC ............... F02D 41/008; F02D 41/1408; F02D 41/1475; F02D 41/1497; F02D 41/2458;
(Continued)

(56) References Cited

U.S. PATENT DOCUMENTS 5,845,492 A * 12/1998 Isobe ...................... F01N 3/22
60/284
2019/0107070 A1* 4/2019 Ikuta ................... F02D 41/1408
2019/0128198 A1* 5/2019 Ban ....................... F01N 11/007

FOREIGN PATENT DOCUMENTS

| JP | 2016-31050  | 3/2016 |
| JP | 2016-153608 | 8/2016 |
| JP | 2017-150457 | 8/2017 |

OTHER PUBLICATIONS

U.S. Appl. No. 16/152,036, filed Oct. 4, 2018, Yuya Yoshikawa, et al.

* cited by examiner

*Primary Examiner* — Thomas N Moulis
(74) *Attorney, Agent, or Firm* — Oblon, McClelland, Maier & Neustadt, L.L.P.

(57) ABSTRACT

A first limit requesting process limits a dither control process of fuel injection valves in such a manner that the absolute value of the difference between the air-fuel ratios of the cylinders becomes smaller when the degree of variation of the injection amounts of the fuel injection valves provided for respective cylinders is great than when the degree of variation is small. A second limit requesting process limits the dither control process in such a manner that the absolute value is smaller when the torque fluctuation amount of the internal combustion engine is great than when the torque fluctuation amount is small. The limiting process limits the dither control process in accordance with one of requests generated by the first limit requesting process and the second limit requesting process that causes the absolute value to be smaller than the other.

7 Claims, 6 Drawing Sheets

(51) Int. Cl.

| | |
|---|---|
| *F02P 5/04* | (2006.01) |
| *F02P 5/15* | (2006.01) |
| *F02D 41/26* | (2006.01) |
| *F02D 41/38* | (2006.01) |
| *F02D 41/24* | (2006.01) |
| *F02D 41/14* | (2006.01) |
| *F02D 41/40* | (2006.01) |

(52) U.S. Cl.
CPC ..... *F02D 41/1497* (2013.01); *F02D 41/2458* (2013.01); *F02D 41/263* (2013.01); *F02D 41/38* (2013.01); *F02D 41/401* (2013.01); *F02P 5/045* (2013.01); *F02P 5/15* (2013.01); *F02P 5/1502* (2013.01); *F02D 41/1498* (2013.01); *F02D 2200/0614* (2013.01); *F02D 2200/1002* (2013.01); *F02D 2200/1015* (2013.01)

(58) Field of Classification Search
CPC ...... F02D 41/263; F02D 41/401; F02D 41/38; F02D 41/1498; F02D 2200/1002; F02D 2200/1015; F02D 2200/0614; F02P 5/1502; F02P 5/045; F02P 5/15
See application file for complete search history.

CONTROLLER AND CONTROL METHOD FOR INTERNAL COMBUSTION ENGINE

BACKGROUND

The present disclosure relates to a controller and control method for an internal combustion engine. The controller and the control method control an internal combustion engine that includes an exhaust purifying device, which purifies exhaust gas discharged from the cylinders, and fuel injection valves provided for the respective cylinders.

For example, Japanese Laid-Open Patent Publication No. 2016-31050 discloses a controller that executes dither control. In the dither control, when there is a requirement for an increase in the temperature of a catalyst device (exhaust purification device), at least one of the cylinders is treated as a rich combustion cylinder, in which the air-fuel ratio is richer than the stoichiometric air-fuel ratio, and the remaining cylinders are treated as lean combustion cylinders, in which the air-fuel ratio is leaner than the stoichiometric air-fuel ratio.

SUMMARY

An anomaly in the control of the internal combustion engine includes, for example, an imbalance anomaly, which is an anomaly of causing variation, or imbalance, in the injection amount of fuel injection valves of respective cylinders when the fuel injection valves are operated to control the air-fuel ratios in the respective cylinders to be equal to each other. If an imbalance anomaly occurs, oxygen and unburnt fuel flow into the exhaust purifying device, and the unburnt fuel is burned in the exhaust purifying device, which may cause the temperature of the exhaust purifying device to increase.

Furthermore, in a case in which a misfire occurs as an anomaly in the control of the internal combustion engine also, oxygen and unburnt fuel flow into the exhaust purifying device, and the unburnt fuel is burned in the exhaust purifying device, which may cause the temperature of the exhaust purifying device to increase. In a case in which such an imbalance anomaly or a misfire occurs, executing the dither control may possibly cause the temperature of the exhaust purifying device to be excessively increased, resulting in deterioration of the exhaust purifying device.

Examples of the present disclosure will now be described.

Example 1: A controller for an internal combustion engine is provided. The internal combustion engine includes an exhaust purifying device, which purifies exhaust gas discharged from a plurality of cylinders, and fuel injection valves provided for the respective cylinders.

The controller being configured to execute a dither control process of operating the fuel injection valves in such a manner that at least one of the cylinders is designated as a rich combustion cylinder and at least another one of the cylinders is designated as a lean combustion cylinder, an air-fuel ratio of the rich combustion cylinder being richer than a stoichiometric air-fuel ratio, and an air-fuel ratio of the lean combustion cylinder being leaner than a stoichiometric air-fuel ratio, a first limit requesting process of, in a case in which the fuel injection valves are operated to control air-fuel ratios of the respective cylinders to be equal to each other, requesting to limit the dither control process in such a manner that an absolute value of a difference between the air-fuel ratios of the cylinders is when a degree of variation of the injection amounts of the fuel injection valves of the respective cylinders is great than when the degree of variation is small, a second limit requesting process of requesting to limit the dither control process in such a manner that the absolute value is smaller when a torque fluctuation amount of the internal combustion engine is great than when the torque fluctuation amount is small, and a limiting process of limiting the dither control process in such a manner that the absolute value decreases in accordance with one of requests generated by the first limit requesting process and the second limit requesting process that causes the absolute value to be smaller than the other.

The temperature of the exhaust purifying device is increased more easily when the degree of variation is great than when the degree of variation is small since oxygen and unburnt fuel flow into the exhaust purifying device, and the unburnt fuel is burned in the exhaust purifying device. With this being the case, the first limit requesting process reduces the absolute value of the difference between the air-fuel ratios of the cylinders more when the degree of variation is great than when the degree of variation is small. Thus, even if there is a tendency that the temperature of the exhaust purifying device is easily increased due to the variation at the same time as when the temperature of the exhaust purifying device is increased by the dither control, the temperature of the exhaust purifying device is inhibited from being excessively increased. Furthermore, the amount of unburnt fuel and the amount of oxygen in the exhaust gas are more likely to increase when the torque fluctuation amount is great than when the torque fluctuation amount is small. Thus, as the oxygen and the unburnt fuel flow into the exhaust purifying device, and the unburnt fuel is burned in the exhaust purifying device, the temperature of the exhaust purifying device is easily increased. With this being the case, the second limit requesting process reduces the absolute value of the difference between the air-fuel ratios of the cylinders more when the torque fluctuation amount is great than when the torque fluctuation amount is small. Thus, even if there is a tendency that the temperature of the exhaust purifying device is easily increased due to the combustion state with a great torque fluctuation amount at the same time as when the exhaust temperature is increased by the dither control, the temperature of the exhaust purifying device is inhibited from being excessively increased.

In particular, in the above-described configuration, the absolute value is limited in accordance with one of the requests generated by the first limit requesting process and the second limit requesting process that reduces the absolute value of the difference between the air-fuel ratios of the cylinders more than the other. Thus, both the imbalance anomaly and the torque fluctuation are properly addressed.

Example 2: The controller of Example 1 is further configured to execute an advancing process of advancing an ignition timing more when the torque fluctuation amount of the internal combustion engine is great than when the torque fluctuation amount is small, and an adjustment process of executing the limiting process prior to the execution of the advancing process when the torque fluctuation amount increases during execution of the dither control process.

The amount of unburnt fuel and the amount of oxygen in the exhaust gas are more likely to increase when the torque fluctuation amount is great than when the torque fluctuation amount is small. Thus, as the oxygen and the unburnt fuel flow into the exhaust purifying device, and the unburnt fuel is burned in the exhaust purifying device, the temperature of the exhaust purifying device is easily increased. With this being the case, the advancing process advances the ignition timing more when the torque fluctuation amount is great than when the torque fluctuation amount is small. Thus, even if there is a tendency that the temperature of the exhaust purifying device is easily increased due to the combustion state with a great torque fluctuation amount at the same time as when the exhaust temperature is increased due to retardation of the ignition timing, the temperature of the exhaust purifying device is inhibited from being excessively increased. However, in a case in which the torque fluctuation amount is increased during execution of the dither control process, if a process for limiting the dither control process based on the second limit requesting process and the advancing process are executed simultaneously, it is unclear whether the increase in the torque fluctuation amount is inhibited by limiting the dither control process or by setting the ignition timing to be advanced. This may possibly cause hunting of execution and suspension of both measures. In the above-described configuration, such hunting is inhibited since the adjustment process first limits the dither control process.

Example 3: The controller of Example 2 is further configured to execute a retardation requirement amount setting process of setting a requested retardation amount of the ignition timing in accordance with a rotational speed and a load of a crankshaft of the internal combustion engine. The advancing process corrects the requested retardation amount to decrease in accordance with the torque fluctuation amount.

In the above-described configuration, the advancing process is executed by correcting the requested retardation amount to decrease. Thus, for example, as compared with a case in which the advancing process is executed by the process of calculating an advancement correction amount itself, the advancing process is easily executed without referring to the rotational speed and the load.

Example 4: In the controller of Example 2 or 3, the advancing process includes a process of advancing the ignition timing more when the degree of variation is great than when the degree of variation is small.

The temperature of the exhaust purifying device is increased more easily when the degree of variation is great than when the degree of variation is small since oxygen and unburnt fuel flow into the exhaust purifying device, and the unburnt fuel is burned in the exhaust purifying device. With this being the case, the advancing process advances the request for the ignition timing more when the degree of variation is great than when the degree of variation is small. Thus, even if there is a tendency that the temperature of the exhaust purifying device is easily increased due to the variation at the same time as when the exhaust temperature is increased due to retardation of the ignition timing, the temperature of the exhaust purifying device is inhibited from being excessively increased.

Example 5: In the controller of any one of Examples 2 to 4, the second limit requesting process includes a process of causing a changing speed of a request for the absolute value in response to a case in which the torque fluctuation amount is changed from a great value to a small value to be lower than a changing speed of a request for the absolute value in response to a case in which the torque fluctuation amount is changed from a small value to a great value.

If the torque fluctuation is great, unburnt fuel and oxygen flow into the exhaust purifying device, and the temperature of the exhaust purifying device may possibly increase. It is therefore desirable to promptly reduce the absolute value of the difference between the air-fuel ratios of the cylinders to reduce the increase in the temperature of the exhaust purifying device caused by the dither control. If the torque fluctuation is changed from a great value to a small value, rapidly increasing the absolute value may possibly reduce the torque abruptly. This is because, as compared with a case in which the air-fuel ratios of all the cylinders are set to the target air-fuel ratio, the degree to which the torque of the lean combustion cylinders is decreased is greater than the degree to which the torque of the rich combustion cylinders is increased. Thus, the torque is less when the absolute value of the difference between the air-fuel ratios of the cylinders is great than when the absolute value is small. Thus, the speed is set as described above aiming at returning the absolute value of the difference between the air-fuel ratios of the cylinders to the original absolute value while promptly inhibiting the increase in the temperature of the exhaust purifying device when the torque fluctuation amount is increased and inhibiting the shaft torque of the internal combustion engine from being abruptly decreased when the torque fluctuation amount is decreased.

Example 6: A control method for an internal combustion engine is provided that performs the various processes described in Examples 1 to 5.

Example 7: A non-transitory computer readable memory medium is provided that stores a program that causes a processing device to perform the various processes described in Examples 1 to 5.

Other aspects and advantages of the present disclosure will become apparent from the following description, taken in conjunction with the accompanying drawings, illustrating exemplary embodiments.

BRIEF DESCRIPTION OF THE DRAWINGS

The disclosure may be understood by reference to the following description together with the accompanying drawings.

DETAILED DESCRIPTION

A controller for an internal combustion engine according to one embodiment will now be described with reference to FIGS. 1 to 7.

Figure 1:
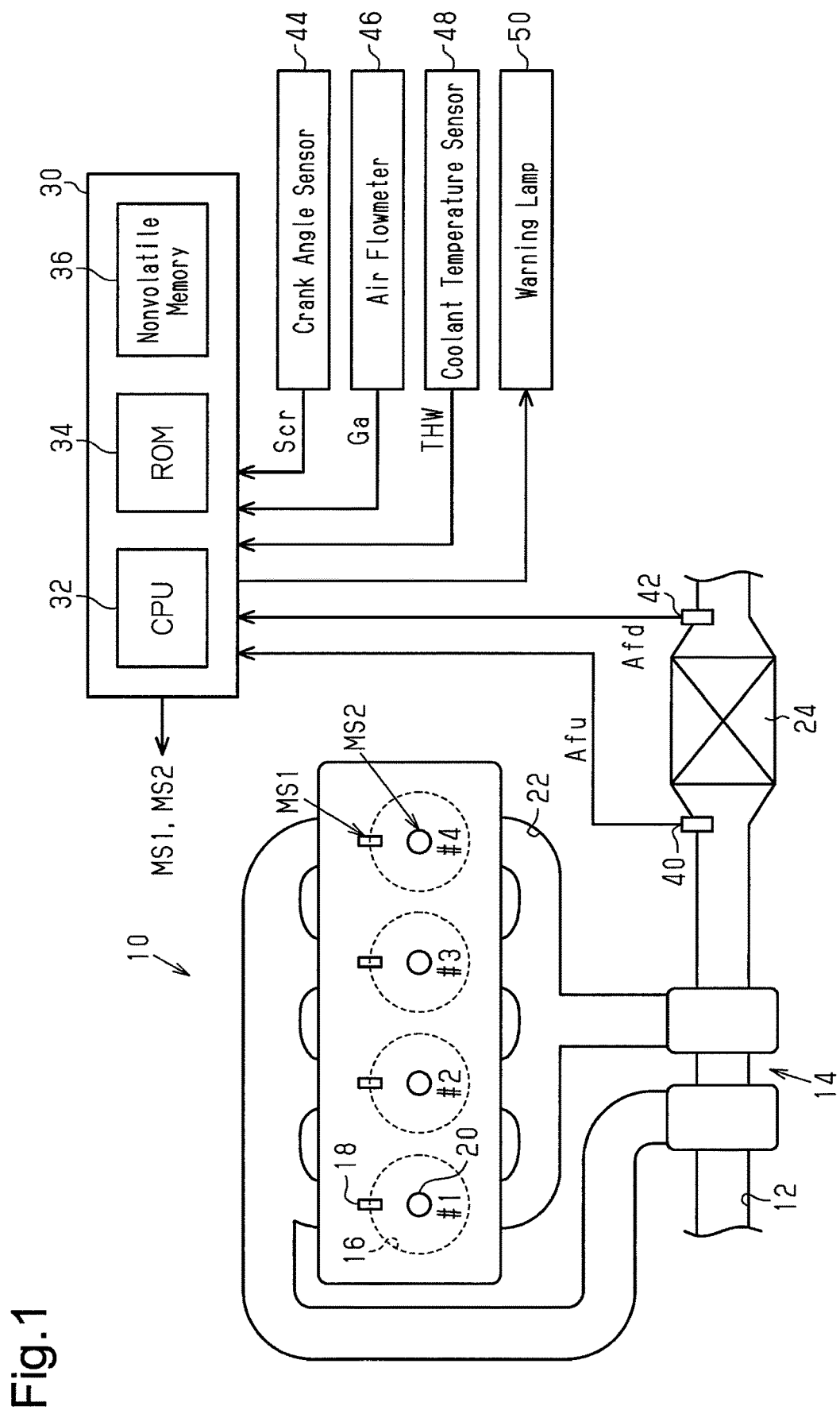
FIG. 1 is a diagram of an internal combustion engine and a controller for an internal combustion engine according to one embodiment.

An internal combustion engine 10 shown in FIG. 1 is mounted on a vehicle. In the internal combustion engine 10, the air drawn in from an intake passage 12 flows into combustion chambers 16 of respective cylinders #1 to #4 via a forced-induction device 14. Each of the cylinders #1 to #4 is provided with a fuel injection valve 18 configured to inject fuel and an ignition device 20 configured to generate spark discharge. In each combustion chamber 16, air-fuel mixture is subjected to combustion, and the air-fuel mixture subjected to combustion is exhausted to an exhaust passage 22 as exhaust gas. A three-way catalyst 24 having an oxygen storage capacity is provided in a section of the exhaust passage 22 that is downstream of the forced-induction device 14.

A controller 30 controls the internal combustion engine 10 and controls the controlled portions of the engine 10 such as the fuel injection valves 18 and the ignition devices 20, thereby controlling the controlled amounts (the torque, exhaust components, and the like). At this time, the controller 30 refers to an upstream air-fuel ratio Afu detected by an air-fuel ratio sensor 40 provided upstream of the three-way catalyst 24 and a downstream air-fuel ratio Afd detected by an air-fuel ratio sensor 42 provided downstream of the three-way catalyst 24. Further, the controller 30 refers to the output signal Scr of a crank angle sensor 44, the intake air amount Ga detected by an air flowmeter 46, the temperature of the coolant water of the internal combustion engine 10 (coolant temperature THW) detected by a coolant temperature sensor 48. The controller 30 includes a CPU 32, a ROM 34, and a nonvolatile memory 36, which can be electrically rewritten and executes control of the above-described controlled amounts by executing programs stored in the ROM 34 using the CPU 32.

Figure 2:
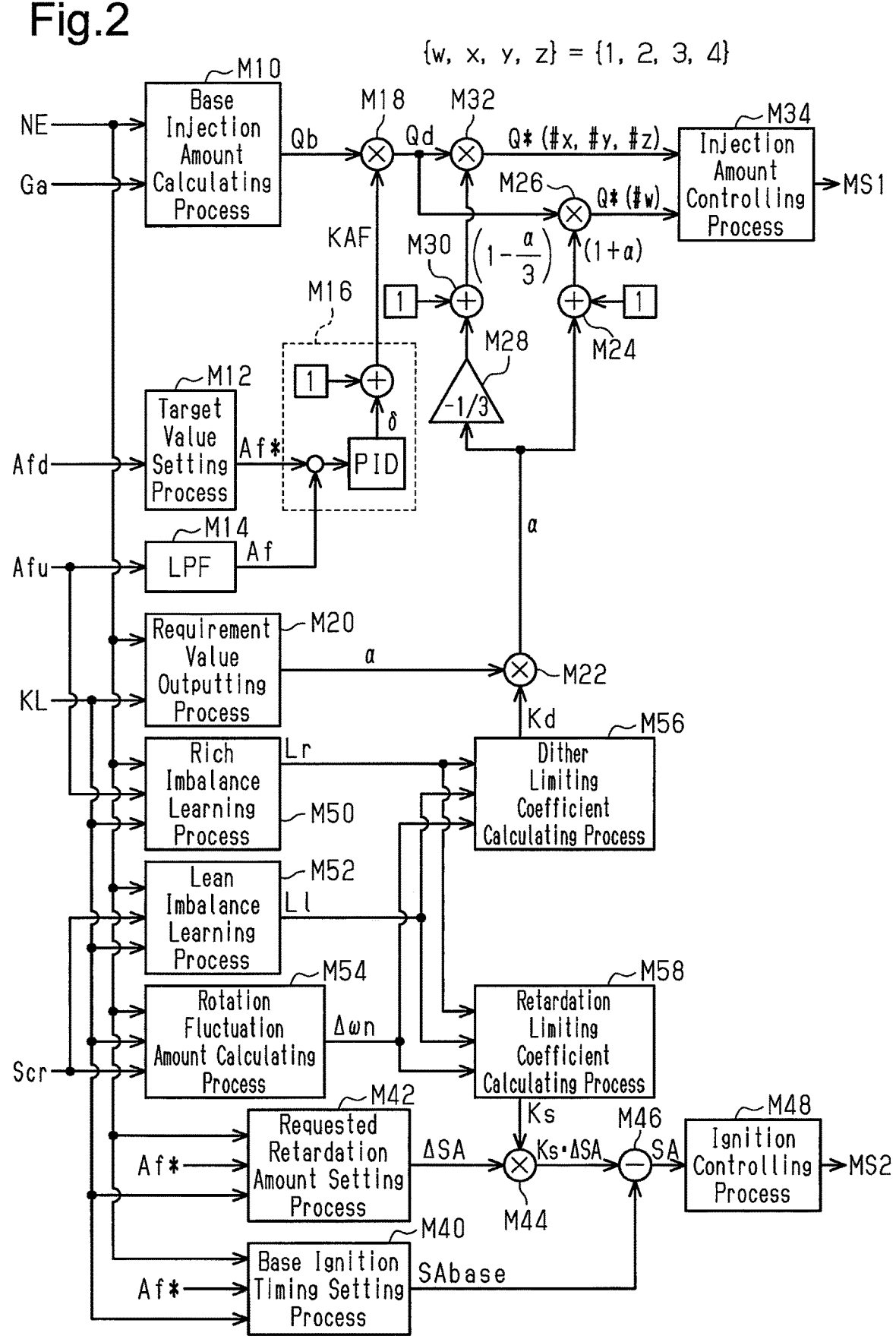
FIG. 2 is a block diagram showing part of processes executed by the controller in the internal combustion engine of FIG. 1.
Figure 3:
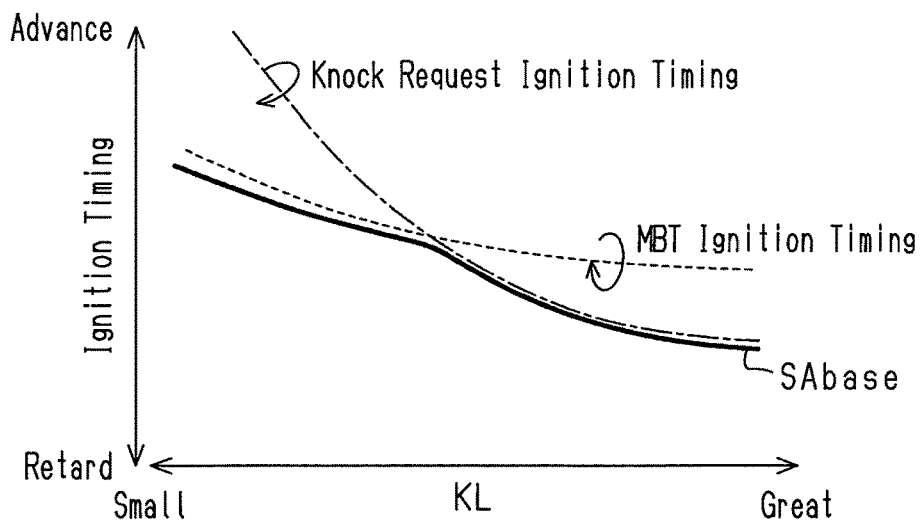
FIG. 3 is a diagram illustrating an ignition timing setting process in the internal combustion engine of FIG. 1.

FIG. 2 shows part of the processes that are implemented by the CPU 32 executing programs stored in the ROM 34.

A base injection amount calculating process M10 calculates a base injection amount Qb based on the intake air amount Ga and the rotational speed NE, which is calculated based on the output signal Scr of the crank angle sensor 44. The base injection amount Qb is an open-loop operation amount, which is an operation amount for executing open-loop control to set the air-fuel ratio of the air-fuel mixture in the combustion chambers 16 to a target air-fuel ratio.

A target value setting process M12 sets a target value Af* of the feedback control amount that is used to control the air-fuel ratio of the air-fuel mixture in the combustion chamber 16 to be the target air-fuel ratio. More specifically, in the present embodiment, the target value setting process M12 includes correcting the target value Af* with an operation amount used to execute feedback control to cause the downstream air-fuel ratio Afd to be the target value.

A low-pass filter process M14 calculates an air-fuel ratio Af by removing high-frequency components of the upstream air-fuel ratio Afu.

A feedback process M16 calculates a feedback operation amount KAF, which is an operation amount used to execute feedback control to cause the air-fuel ratio Af, which is a feedback control amount, to be the target value Af*. In the present embodiment, the sum of the output values of a proportional element, an integral element, and a differential element that have, as the input, the difference between the target value Af* and the air-fuel ratio Af is used as a correction factor δ of the base injection amount Qb, and the feedback operation amount KAF is set to (1+δ).

A required injection amount calculating process M18 corrects the base injection amount Qb by multiplying the base injection amount Qb by the feedback operation amount KAF, thereby calculating a required injection amount Qd.

A requirement value outputting process M20 calculates and outputs an injection amount correction requirement value α (hereinafter, abbreviated as correction requirement value α) used in dither control, in which the air-fuel ratios of the air-fuel mixture to be burned are differentiated among the cylinders, while the components of the entire exhaust gas discharged from the respective cylinders #1 to #4 of the internal combustion engine 10 are made equivalent to that in the case in which the air-fuel ratios of the air-fuel mixture to be burned in all the cylinders #1 to #4 are set to the target air-fuel ratio. In the dither control according to the present embodiment, one of the first to fourth cylinders #1 to #4 is a rich combustion cylinder, in which the air-fuel ratio is made richer than the stoichiometric air-fuel ratio, and the remaining three cylinders are lean combustion cylinders, in which the air-fuel ratio is leaner than the stoichiometric air-fuel ratio. The injection amount in the rich combustion cylinder is calculated by multiplying the required injection amount Qd by a value (1+α). The injection amount in each lean combustion cylinder is calculated by multiplying the required injection amount Qd by a value (1−(α/3)). With the above-described setting of the injection amounts for the lean combustion cylinders and the rich combustion cylinder, if the amounts of air filling the cylinders #1 to #4 are the same, the components of the entire exhaust gas discharged from the respective cylinders #1 to #4 of the engine 10 can be made equivalent to those in a case in which the air-fuel ratios of the air-fuel mixture to be burned in all the cylinders #1 to #4 are equal to the target air-fuel ratio. With the above-described setting of the injection amounts, if the amounts of air filling the cylinders #1 to #4 are the same, the reciprocal of the mean value of the fuel-air ratios of the air-fuel mixture to be burned in the cylinders is the target air-fuel ratio. The fuel-air ratio is the reciprocal of the air-fuel ratio.

If a requirement for warming up the three-way catalyst 24 is generated by the requirement value outputting process M20, or if a requirement for executing a release process of releasing the sulfur accumulated in the three-way catalyst 24 is generated, the correction requirement value α is set to a value greater than zero. The warm-up requirement of the three-way catalyst 24 arises when the logical conjunction is true of a condition (i) that the integrated value InGa of the intake air amount Ga from the start of the engine 10 is greater than or equal to a first specified value Inth1 and a condition (ii) that the integrated value InGa is less than or equal to a second specified value Inth2 and the coolant temperature THW is lower than or equal to a predetermined temperature THWth. The condition (i) is a condition in which it is determined that the temperature of the upstream end of the three-way catalyst 24 has reached the activating temperature. The condition (ii) is a condition in which it is determined that the three-way catalyst 24 has not been entirely activated. Furthermore, the execution requirement for the sulfur release process only needs to be generated when the sulfur poisoning amount of the three-way catalyst 24 is greater than or equal to a predetermined value, and the sulfur poisoning amount only needs to be calculated by, for example, calculating the increase amount of the poisoning amount to have a greater value as the required injection amount Qd increase and by integrating the increase amount.

More specifically, the requirement value outputting process M20 includes variably setting the correction requirement value α based on the rotational speed NE and the load factor KL. More specifically, the ROM 34 stores map data that defines the relationship between the input variables, which are the rotational speed NE and the load factor KL in this embodiment, and the output variable, which is the correction requirement value α in this embodiment, and the CPU 32 only needs to perform map computation of the correction requirement value α using the map data. A map refers to a data set of discrete values of input variables and values of output variables each corresponding to a value of the input variables. When the value of an input variable matches one of the values of input variable on the map data, the map calculation uses the value of the corresponding output variable as the calculation result. When the value of the input variable does not match any of the values of the input variable of the map data, the map calculation uses a value obtained by interpolation of multiple values of the output variable included in the data set as the calculation result. The load factor KL is the ratio of the inflow air amount per combustion cycle of one cylinder to a reference inflow air amount. The load factor KL quantifies the cylinder filling air amount. The reference inflow air amount may be variably set in accordance with the rotational speed NE.

A dither limiting process M22 updates the correction requirement value α using a value obtained by multiplying the correction requirement value α by a dither limiting coefficient Kd.

A correction coefficient calculating process M24 adds the correction requirement value α to 1 to calculate a correction coefficient for the required injection amount Qd with respect to the rich combustion cylinder. A dither correcting process M26 multiplies the required injection amount Qd by the correction coefficient (1+α) to calculate the injection amount command value Q* for the cylinder #w that is designated as a rich combustion cylinder. In this case, w refers to any of 1 to 4.

A multiplication process M28 multiplies the correction requirement value α by −1/3. A correction coefficient calculating process M30 adds the output value of the multiplication process M28 to 1 to calculate the correction coefficient for the required injection amount Qd with respect to each lean combustion cylinder. A dither correcting process M32 multiplies the required injection amount Qd by the correction coefficient (1−(α/3)) to calculate the injection amount command value Q* for the cylinders #x, #y, and #z, which are designated as the lean combustion cylinders. In this case, x, y, z are each any of 1 to 4, and w, x, y, z are all different.

An injection amount controlling process M34 generates an operation signal MS1 for the fuel injection valve 18 of the cylinder #w designated as the rich combustion cylinder based on the injection amount command value Q* output by the dither correcting process M26 and outputs the signal MS1 to the same fuel injection valve 18, thereby operating the fuel injection valve 18 such that the amount of fuel injected from the fuel injection valve 18 becomes the amount corresponding to the injection amount command value Q*. Also, the injection amount controlling process M34 generates an operation signal MS1 for the fuel injection valves 18 of the cylinders #x, #y, and #z designated as the lean combustion cylinders based on the injection amount command value Q* output by the dither correcting process M32 and outputs the signal MS1 to the same fuel injection valves 18, thereby operating the fuel injection valves 18 such that the amount of fuel injected from the fuel injection valves 18 becomes the amount corresponding to the injection amount command value Q*.

A base ignition timing setting process M20 sets a base ignition timing SAbase in accordance with the rotation speed NE, a load factor KL, and the target value Af*. As shown by the solid line in FIG. 3, the base ignition timing SAbase is the more retarded one of two ignition timings including the minimum advance for best torque (MBT) ignition timing, which is the ignition timing at which the generation efficiency of the engine torque becomes the maximum, and a knock request ignition timing, which is the limit of advancement of the ignition timing that can avoid generation of knocking. The process is implemented by storing map data that uses the rotation speed NE, the load factor KL, and the target value Af* as the input variable and the base ignition timing SAbase as the output variable in the ROM 34 and allowing the CPU 32 to perform map computation of the base ignition timing SAbase.

Referring back to FIG. 2, a requested retardation amount setting process M42 calculates a requested retardation amount ΔSA, which is a retardation amount used to reduce vibration and noise of the vehicle caused due to a rapid increase in the combustion pressure. The factor behind this is that the combustion of the air-fuel mixture in the combustion chamber 16 is performed at a high-speed since the internal combustion engine 10 of the present embodiment has a high compression ratio. More specifically, the requested retardation amount setting process M42 variably sets the requested retardation amount ΔSA in accordance with the rotation speed NE, the load factor KL, and the target value Af*. The process is implemented by storing map data that uses the rotation speed NE, the load factor KL, and the target value Af* as the input variable and the requested retardation amount ΔSA as the output variable in the ROM 34 and allowing the CPU 32 to perform map computation of the requested retardation amount ΔSA.

A retardation limiting process M44 multiplies the requested retardation amount ΔSA by a retardation limiting coefficient Ks, which will be discussed below. An ignition retardation process M46 subtracts Ks·ΔSA from the base ignition timing SAbase to calculate an ignition timing SA. The value of the ignition timing SA is increased as the ignition timing SA is advanced.

An ignition control process M48 outputs an operation signal MS2 to the ignition device 20 to operate the ignition device 20 in accordance with the ignition timing SA.

A rich imbalance learning process M50 calculates a learning value of a rich imbalance, that is, a rich learning value Lr and stores the rich learning value Lr in the nonvolatile memory 36. In this specification, the rich imbalance refers to a case in which, when the fuel injection valves 18 of the cylinders #1 to #4 are operated to control the air-fuel ratios of the air-fuel mixture in all the cylinders #1 to #4 to be the same value, the air-fuel ratio of a specific cylinder becomes richer than the above-described same value. More specifically, the rich imbalance learning process M50 includes calculating the variation of the upstream air-fuel ratio Afu per a predetermined time, which is a time variation ΔAf, from time-series data of the upstream air-fuel ratio Afu and calculating the rich learning value Lr based on the time variation ΔAf. In this embodiment, the rich imbalance is greater when the time variation ΔAf is great than when the time variation ΔAf is small, and the rich learning value Lr is calculated to be a great value. However, since the time variation ΔAf also changes in accordance with the rotation speed NE and the load factor KL besides the rich imbalance, a normalization coefficient is determined based on the rotation speed NE and the load factor KL, and the time variation ΔAf is divided by the normalization coefficient to be normalized. The process is implemented by storing map data that uses the rotation speed NE and the load factor KL as the input variable and the normalization coefficient as the output variable in the ROM 34 and allowing the CPU 32 to perform map computation of the normalization coefficient.

The rich imbalance learning process M50 includes updating the rich learning value Lr stored in the nonvolatile memory 36 in accordance with the additionally normalized value. In this embodiment, the value stored in the nonvolatile memory 36 only needs to be updated to an exponential moving average processed value of the value stored in the nonvolatile memory 36 and the additionally normalized value. Furthermore, the rich imbalance learning process M50 includes, if the rich learning value Lr is greater than or equal to a predetermined value, operating a warning lamp 50 shown in FIG. 1 and informing the user of the vehicle that there is an anomaly.

A lean imbalance learning process M52 calculates a learning value of lean imbalance, that is, a lean learning value L1 and stores the lean learning value L1 in the nonvolatile memory 36. In this specification, the lean imbalance refers to a case in which, when the fuel injection valves 18 of the cylinders #1 to #4 are operated to control the air-fuel ratios of the air-fuel mixture in all the cylinders #1 to #4 to be the same value, the air-fuel ratio of a specific cylinder becomes leaner than the above-described same value. More specifically, the lean imbalance learning process M52 includes acquiring time-series data of an instantaneous speed $\omega 1$, which is the rotation speed in the rotational angle region of 30° including the TDC of the cylinders #1 to #4 calculated based on the output signal Scr of the crank angle sensor 44 and calculating the lean learning value L1 based on the difference $\Delta\omega 1$ (absolute value) between the instantaneous speeds $\omega 1$ of a pair of cylinders. In this embodiment, the pair of cylinders are, for example, the pair of cylinders in which the compression top dead center appears one after the other. Furthermore, the lean learning value L1 is set to a value greater when the difference $\Delta\omega 1$ is great than when the difference $\Delta\omega 1$ is small since the degree of the lean imbalance is great. However, since the difference $\Delta\omega 1$ changes in accordance with the rotation speed NE and the load factor KL besides the lean imbalance, a normalization coefficient is determined based on the rotation speed NE and the load factor KL, and the difference $\Delta\omega 1$ is divided by the normalization coefficient to be normalized. The process is implemented by storing map data that uses the rotation speed NE and the load factor KL as the input variable and the normalization coefficient as the output variable in the ROM 34 and allowing the CPU 32 to perform map computation of the normalization coefficient.

The lean imbalance learning process M52 also includes updating the lean learning value L1 stored in the nonvolatile memory 36 based on the additionally normalized value. In this embodiment, the value stored in the nonvolatile memory 36 is updated to an exponential moving average processed value of the value stored in the nonvolatile memory 36 and the additionally normalized value. Furthermore, the lean imbalance learning process M32 includes, if the lean learning value L1 is greater than or equal to a predetermined value, operating the warning lamp 50 shown in FIG. 1 and informing the user of the vehicle that there is an anomaly.

A rotation fluctuation amount calculating process M54 calculates a value obtained by normalizing the rotation fluctuation amount $\Delta\omega a$, that is, a normalized rotation fluctuation amount $\Delta\omega n$ based on the output signal Scr. In this embodiment, the rotation fluctuation amount $\Delta\omega$ is an absolute value of a value obtained by subtracting the rotation speed at a predetermined angular interval including the compression top dead center only once, that is, an instantaneous rotation speed $\omega$ of one of the pair of cylinders in which the compression top dead center appears later from that of the other cylinder in which the compression top dead center appears in advancement among the pair of cylinders in which the compression top dead center appears one after the other.

Figure 4:
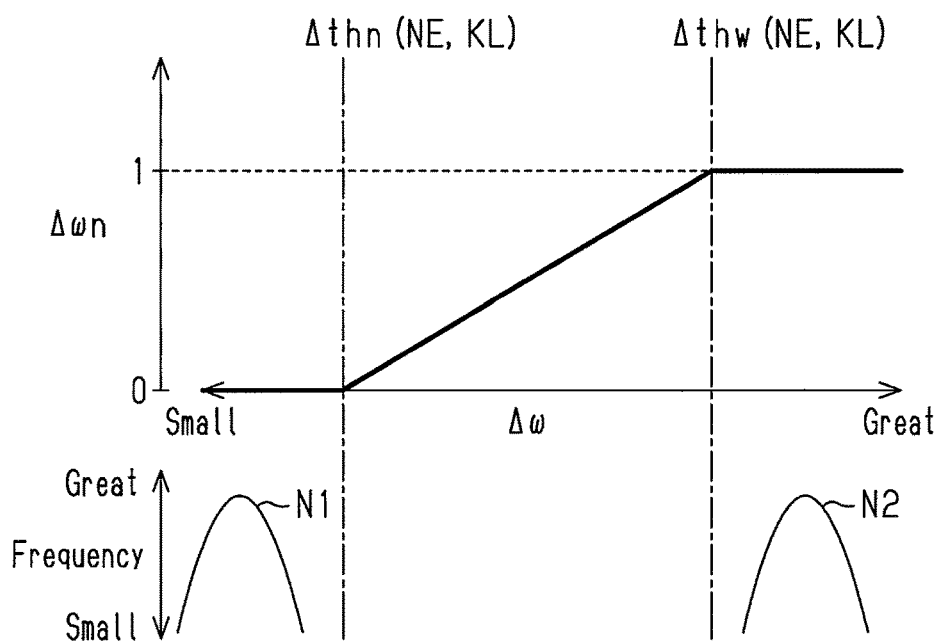
FIG. 4 is a diagram showing a rotation fluctuation amount calculating process in the internal combustion engine of FIG. 1.

FIG. 4 shows the details of the rotation fluctuation amount calculating process M54. FIG. 4 shows a frequency distribution N1 of the rotation fluctuation amount $\Delta\omega$ during normal operation and a frequency distribution N2 of the rotation fluctuation amount $\Delta\omega$ during a misfire. The rotation fluctuation amount $\Delta\omega$ at a normal threshold value $\Delta thn$ is greater than an average rotation fluctuation amount $\Delta\omega$ of the frequency distribution N1, and the rotation fluctuation amount $\Delta\omega$ at an anomaly threshold value $\Delta thw$ is less than an average rotation fluctuation amount $\Delta\omega$ of the frequency distribution N2. The anomaly threshold value $\Delta thw$ is greater than the normal threshold value $\Delta thn$. Considering the fact that the frequency distributions N1, N2 change in accordance with the rotation speed NE and the load factor KL, the rotation fluctuation amount calculating process M54 includes variably setting the normal threshold value $\Delta thn$ and the anomaly threshold value $\Delta thw$ in accordance with the rotation speed NE and the load factor KL. More specifically, the map data that uses the rotation speed NE and the load factor KL as the input variable and the normal threshold value $\Delta thn$ as the output variable and the map data that uses the rotation speed NE and the load factor KL as the input variable and the anomaly threshold value $\Delta thw$ as the output variable are stored in the ROM 34. The CPU 32 only needs to perform map computation of the normal threshold value $\Delta thn$ and the anomaly threshold value $\Delta thw$. Furthermore, the rotation fluctuation amount calculating process M54 sets the normalized rotation fluctuation amount $\Delta\omega n$ to 0 when the rotation fluctuation amount $\Delta\omega$ is less than or equal to the normal threshold value $\Delta thn$ and sets the normalized rotation fluctuation amount $\Delta\omega n$ to 1 when the rotation fluctuation amount $\Delta\omega$ is greater than or equal to the anomaly threshold value $\Delta thw$. When the rotation fluctuation amount $\Delta\omega$ is greater than the normal threshold value $\Delta thn$ and less than the anomaly threshold value $\Delta thw$, the greater the rotation fluctuation amount $\Delta\omega$ is, the greater the normalized rotation fluctuation amount $\Delta\omega n$ is set to. Thus, the normalized rotation fluctuation amount $\Delta\omega n$ is greater than or equal to 0 and less than or equal to 1.

Referring back to FIG. 2, a dither limiting coefficient calculating process M56 calculates a dither limiting coefficient Kd based on the rich learning value Lr, the lean learning value L1, and the normalized rotation fluctuation amount $\Delta\omega n$.

Figure 5:
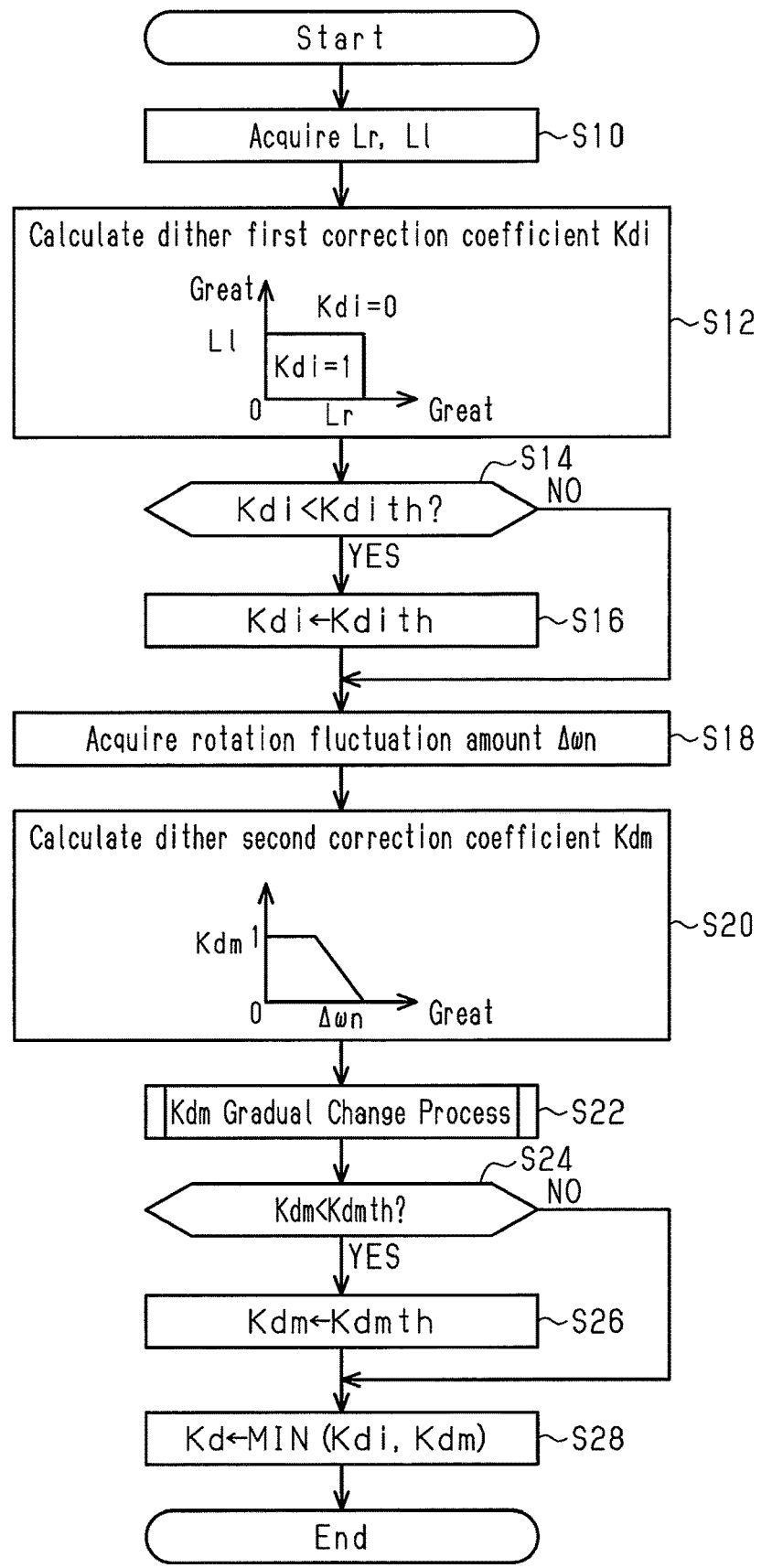
FIG. 5 is a flowchart showing a routine of a dither limiting coefficient calculating process in the internal combustion engine of FIG. 1.

FIG. 5 shows a routine of the dither limiting coefficient calculating process M56. The process shown in FIG. 5 is performed by the CPU 32 repeatedly executing programs stored in the ROM 34 at a predetermined interval. In the following description, the number of each step is represented by the letter S followed by a numeral.

In the series of steps shown in FIG. 5, the CPU 32 reads the rich learning value Lr and the lean learning value L1 from the nonvolatile memory 36 to acquire the rich learning value Lr and the lean learning value L1 (S10). The CPU 32 subsequently calculates a dither first correction coefficient Kdi based on the rich learning value Lr and the lean learning value L1 (S12). The dither first correction coefficient Kdi is a coefficient that serves as the basis of the dither limiting coefficient Kd. More specifically, if the logical disjunction is true of the condition that the rich learning value Lr is greater than or equal to the above-described predetermined value and the condition that the lean learning value L1 is greater than or equal to the above-described predetermined value, the CPU 32 sets the dither first correction coefficient Kdi to 0. If the logical disjunction is false, the CPU 32 sets the dither first correction coefficient Kdi to 1. The above process is performed considering the fact that if the degree of the rich imbalance or the degree of the lean imbalance is great, the temperature of the three-way catalyst 24 is increased due to the imbalance, and executing the dither control in accordance with the correction requirement value α may possibly increase the temperature of the three-way catalyst 24 excessively. That is, if the degree of the imbalance is great, the dither first correction coefficient Kdi is set to 0 so that the dither limiting coefficient Kd is set to 0 through the process (S28), which will be discussed below, and the dither control is prohibited.

Subsequently, the CPU 32 determines whether the dither first correction coefficient Kdi is less than a dither first guard value Kdith (S14). In this embodiment, the CPU 32 variably sets the dither first guard value Kdith in accordance with the rotational speed NE, the load factor KL, and the coolant temperature THW in a range from 0 to 1. More specifically, the CPU 32 grasps the exhaust temperature from the operating point of the internal combustion engine 10 defined by the rotational speed NE and the load factor KL, and when the exhaust temperature corresponding to the grasped operating point is low, the CPU 32 sets the dither first correction coefficient Kdi to a value greater than that when the exhaust temperature corresponding to the grasped operating point is high. This is because it is presumed that, when the original exhaust temperature is low, the temperature of the three-way catalyst 24 will not be excessively increased even in a state in which the temperature of the three-way catalyst 24 is easily increased due to imbalance. Furthermore, when the coolant temperature THW is low, the CPU 32 sets the dither first guard value Kdith to a value greater than that when the coolant temperature THW is high. This is because when the coolant temperature THW is low, the temperature of the three-way catalyst 24 is likely to be lower than that when the coolant temperature THW is high, and it is presumed that the temperature of the three-way catalyst 24 will not be excessively increased even in a state in which the temperature of the three-way catalyst 24 is easily increased due to imbalance. More specifically, the map data that uses the rotation speed NE, the load factor KL, and the coolant temperature THW as the input variable and the dither first guard value Kdith as the output variable is stored in the ROM 34, and the CPU 32 only needs to perform map computation of the dither first guard value Kdith.

If it is determined that the dither first correction coefficient Kdi is less than the dither first guard value Kdith (S14: YES), the CPU 32 substitutes the dither first guard value Kdith for the dither first correction coefficient Kdi (S16). When the process of S16 is completed, or if the decision outcome of the process of S14 is negative, the CPU 32 acquires the normalized rotation fluctuation amount Δωn (S18). The CPU 32 subsequently calculates the dither second correction coefficient Kdm based on the normalized rotation fluctuation amount Δωn (S20). The dither second correction coefficient Kdm is a coefficient that serves as the basis of the dither limiting coefficient Kd. If the normalized rotation fluctuation amount Δωn is less than or equal to a predetermined value, the CPU 32 sets the dither second correction coefficient Kdm to 1, and if the normalized rotation fluctuation amount Δωn is greater than or equal to a specified value greater than the predetermined value, the CPU 32 sets the dither second correction coefficient Kdm to 0. In a case in which the normalized rotation fluctuation amount Δωn is greater than the predetermined value and less than the specified value, the CPU 32 sets the dither second correction coefficient Kdm to a smaller value when the normalized rotation fluctuation amount Δωn is great than when the normalized rotation fluctuation amount Δωn is small. The setting is made considering the fact that in a case in which a misfire or a similar combustion state occurs, unburnt fuel and oxygen flow into the three-way catalyst 24 and are subjected to combustion in the three-way catalyst 24, which causes the temperature of the three-way catalyst 24 to be increased. Thus, executing the dither control in accordance with the correction requirement value α may possibly increase the temperature of the three-way catalyst 24 excessively. That is, if the normalized rotation fluctuation amount Δωn is great, causing the dither second correction coefficient Kdm to approach 0 causes the dither limiting coefficient Kd to approach 0 through the process (S28), which will be discussed below. This limits the correction requirement value α to be small.

Subsequently, the CPU 32 executes a gradual change process of the dither second correction coefficient Kdm (S22).

Figure 6:
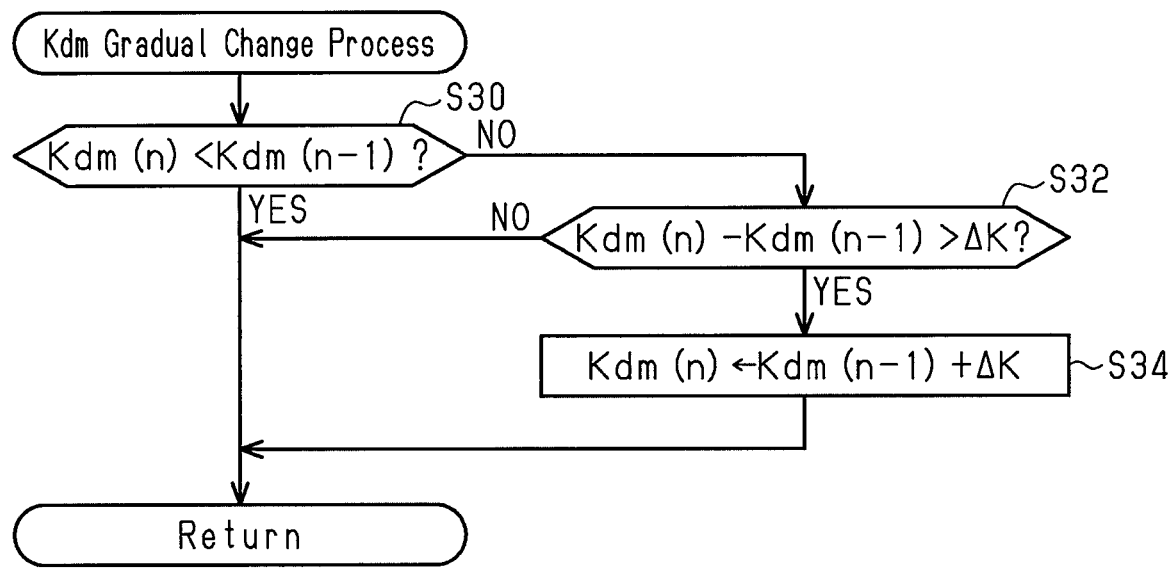
FIG. 6 is a flowchart showing a routine of a gradual change process of a dither second correction coefficient in the internal combustion engine of FIG. 1.

FIG. 6 shows a routine of the gradual change process. The process shown in FIG. 6 is performed by the CPU 32 repeatedly executing programs stored in the ROM 34 at a predetermined interval.

In the series of steps shown in FIG. 6, the CPU 32 first determines whether the dither second correction coefficient Kdm(n) currently calculated through the process of S20 is less than the previously calculated dither second correction coefficient Kdm(n−1) (S30). If it is determined that the currently calculated dither second correction coefficient Kdm(n) is greater than or equal to the previously calculated dither second correction coefficient Kdm(n−1) (S30: NO), the CPU 32 determines whether a value obtained by subtracting the dither second correction coefficient Kdm(n−1) from the dither second correction coefficient Kdm(n) is greater than a gradual change value ΔK (S32). If it is determined that the value obtained by subtracting the dither second correction coefficient Kdm(n−1) from the dither second correction coefficient Kdm(n) is greater than the gradual change value ΔK (S32: YES), the CPU 32 substitutes the value obtained by adding the gradual change value ΔK to the previously calculated dither second correction coefficient Kdm(n−1) for the currently calculated dither second correction coefficient Kdm(n) (S34). The process limits the rate of increase of the dither second correction coefficient Kdm using the gradual change value ΔK. The process limits the speed of increasing the correction requirement value α. When the process of S34 is completed, or if the decision outcome of the process of S30 is positive, or if the decision outcome of the process of S32 is negative, the CPU 32 temporarily suspends the process of FIG. 6.

Referring back to FIG. 5, the CPU 32 determines whether the dither second correction coefficient Kdm is smaller than the dither second guard value Kdmth (S24). In this embodiment, the CPU 32 variably sets the dither second guard value Kdmth in a range from 0 to 1 in accordance with the rotational speed NE, the load factor KL, and the coolant temperature THW. More specifically, the CPU 32 grasps the exhaust temperature from the operating point of the internal combustion engine 10 defined by the rotational speed NE and the load factor KL. When the exhaust temperature corresponding to the grasped operating point is low, the CPU 32 sets the dither second guard value Kdmth to a value greater than that when the exhaust temperature corresponding to the grasped operating point is high. This is because it is presumed that when the original exhaust temperature is low, the temperature of the three-way catalyst 24 will not be excessively increased even in a state in which the temperature of the three-way catalyst 24 is easily increased due to, for example, a misfire. Furthermore, when the coolant temperature THW is low, the CPU 32 sets the dither second guard value Kdmth to a value greater than that when the coolant temperature THW is high. This is because when the coolant temperature THW is low, the temperature of the three-way catalyst 24 is likely to be lower than that when the coolant temperature THW is high, and it is presumed that the temperature of the three-way catalyst 24 will not be excessively increased even in a state in which the temperature of the three-way catalyst 24 is easily increased due to, for example, a misfire. More specifically, the map data that uses the rotation speed NE, the load factor KL, and the coolant temperature THW as the input variable and the dither second guard value Kdmth as the output variable is stored in the ROM 34, and the CPU 32 only needs to perform map computation of the dither second guard value Kdmth.

If it is determined that the dither second correction coefficient Kdm is less than the dither second guard value Kdmth (S24: YES), the CPU 32 substitutes the dither second guard value Kdmth for the dither second correction coefficient Kdm (S26). When the process of S26 is completed, or if the decision outcome of the process of S24 is negative, the CPU 32 substitutes the smaller one of the dither first correction coefficient Kdi and the dither second correction coefficient Kdm for the dither limiting coefficient Kd (S28). When the process of step S28 is completed, the CPU 32 temporarily ends the series of processes shown in FIG. 5.

Referring back to FIG. 2, a retardation limiting coefficient calculating process M58 calculates the retardation limiting coefficient Ks based on the rich learning value Lr, the lean learning value L1, and the normalized rotation fluctuation amount $\Delta\omega n$.

Figure 7:
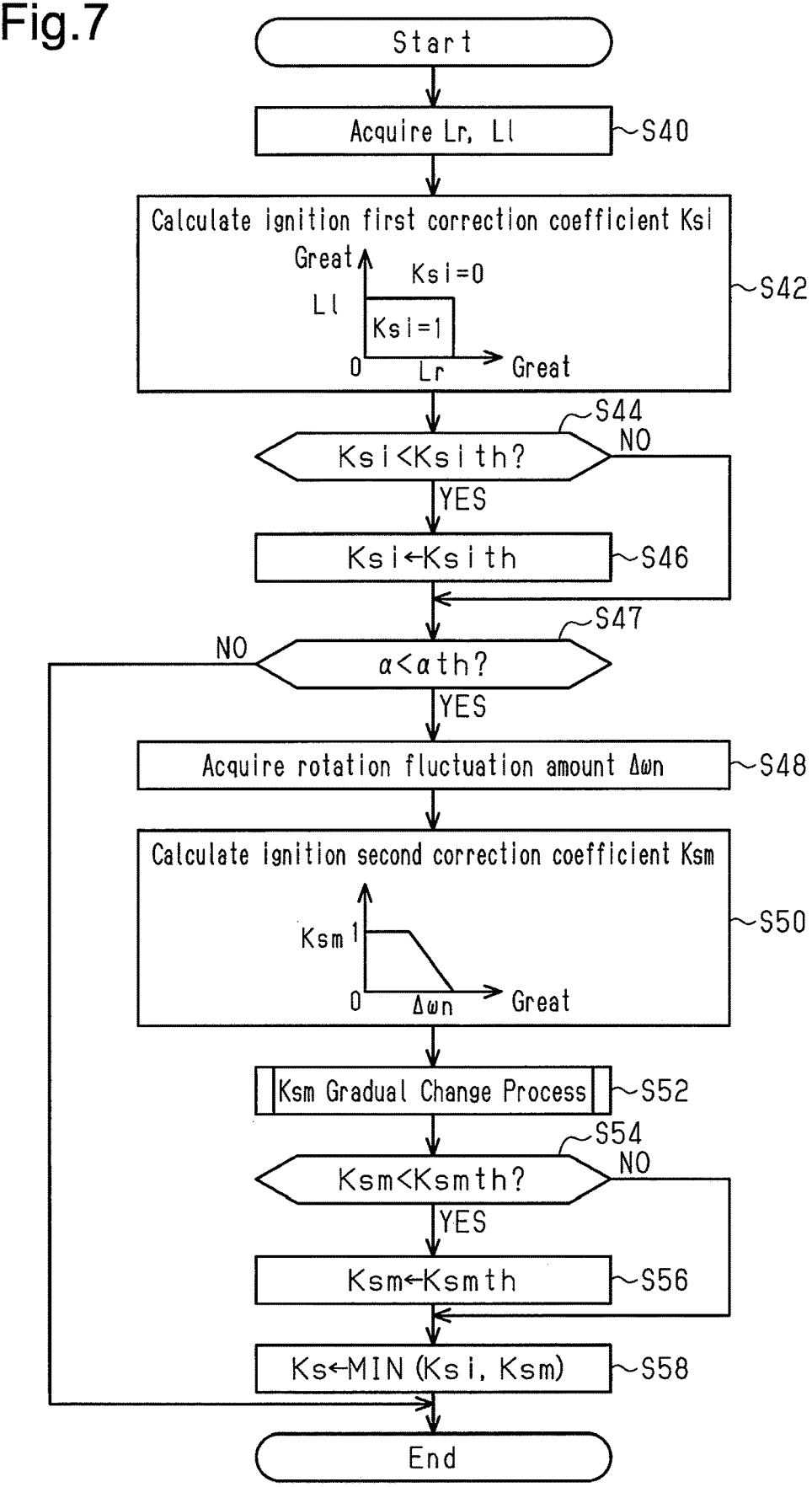
FIG. 7 is a flowchart showing a routine of a retardation limiting coefficient calculating process in the internal combustion engine of FIG. 1.

FIG. 7 shows a routine of the retardation limiting coefficient calculating process M58. The process shown in FIG. 7 is performed by the CPU 32 repeatedly executing programs stored in the ROM 34 at a predetermined interval.

In the series of steps shown in FIG. 7, the CPU 32 executes the processes corresponding to the processes of S10 to S16 of FIG. 5 in the processes of S40 to S46. In the processes of S40 to S46, the ignition first correction coefficient Ksi, which serves as the basis of the retardation limiting coefficient Ks, is used instead of the dither first correction coefficient Kdi, and the ignition first guard value Ksith is used instead of the dither first guard value Kdith. If the dither first correction coefficient Kdi is set to zero in the process of S12, the ignition first correction coefficient Ksi is set to zero in the process of S42. Furthermore, the ignition first guard value Ksith is variably set in a range from 0 to 1 in accordance with the rotational speed NE, the load factor KL, and the coolant temperature THW.

Subsequently, when the process of S46 is completed, or if the decision outcome of the process of S44 is negative, the CPU 32 determines whether the correction requirement value $\alpha$ is less than the threshold value $\alpha$th (S47). In the present embodiment, the threshold value $\alpha$th is set to a value smaller than the minimum value that is other than zero among the correction requirement values $\alpha$ set by the requirement value outputting process M20. The process of S47 determines whether the logical disjunction is true of the condition that the dither control is not being executed and the condition that the dither control is limited by the process of FIG. 5.

If it is determined that the correction requirement value $\alpha$ is less than the threshold value $\alpha$th (S47: YES), the CPU 32 executes the processes corresponding to the above-described processes of S18 to S28 in the processes of S48 to S58. In this embodiment, in the processes of S48 to S58, the ignition second correction coefficient Ksm, which serves as the basis of the retardation limiting coefficient Ks, is used instead of the dither second correction coefficient Kdm, the ignition second guard value Ksmth is used instead of the dither second guard value Kdmth, and the retardation limiting coefficient Ks is used instead of the dither limiting coefficient Kd. The ignition second correction coefficient Ksm takes a value from 1 to 0, and the ignition second correction coefficient Ksm takes a smaller value when the normalized rotation fluctuation amount $\Delta\omega n$ is great than when the normalized rotation fluctuation amount $\Delta\omega n$ is small. However, the normalized rotation fluctuation amount $\Delta\omega n$ with which the ignition second correction coefficient Ksm takes a value 1 does not necessarily match with the normalized rotation fluctuation amount $\Delta\omega n$ with which the dither second correction coefficient Kdm takes a value 1, and the normalized rotation fluctuation amount $\Delta\omega n$ with which the ignition second correction coefficient Ksm takes a value 0 does not necessarily match with the rotation fluctuation amount $\Delta\omega$ with which the dither second correction coefficient Kdm takes a value 0.

When the process of S58 is completed, or if the decision outcome of the process of S47 is negative, the CPU 32 temporarily suspends the series of steps shown in FIG. 7.

The operation and advantages of the present embodiment will now be described.

If the rich learning value Lr or the lean learning value L1 is greater than or equal to the predetermined value, the CPU 32 sets the dither limiting coefficient Kd to zero and prohibits the dither control. Thus, even if there is a tendency that the temperature of the three-way catalyst 24 is easily increased due to an imbalance anomaly at the same time as when the temperature of the three-way catalyst 24 is likely to be increased by the dither control, the temperature of the three-way catalyst 24 is inhibited from being excessively increased. Furthermore, the CPU 32 causes the dither limiting coefficient Kd to approach zero more when the normalized rotation fluctuation amount $\Delta\omega n$ is great due to, for example, a misfire, than when the normalized rotation fluctuation amount $\Delta\omega n$ is small. Thus, even if there is a tendency that the temperature of the three-way catalyst 24 is easily increased due to, for example, a misfire at the same time as when the exhaust temperature is increased by the dither control, the temperature of the three-way catalyst 24 is inhibited from being excessively increased.

In particular, the present embodiment properly addresses both the imbalance anomaly and the rotation fluctuation caused by, for example, a misfire by setting the dither limiting coefficient Kd to the smaller one of the dither first correction coefficient Kdi and the dither second correction coefficient Kdm.

The present embodiment described above further has the following operation and advantages.

(1) The retardation limiting coefficient Ks is set to a smaller value when the normalized rotation fluctuation amount $\Delta\omega n$ is great than when the normalized rotation fluctuation amount $\Delta\omega n$ is small to limit the ignition retardation. However, when the normalized rotation fluctuation amount $\Delta\omega n$ is increased during execution of the dither control, the correction requirement value $\alpha$ is limited so as to be decreased prior to limiting the ignition retardation. This inhibits hunting that is otherwise caused by simultaneously limiting the ignition retardation and the correction requirement value $\alpha$. In this embodiment, hunting is presumed to be caused because, when the normalized rotation fluctuation amount Δωn is decreased by simultaneously limiting the ignition retardation and the correction requirement value α, it is unclear whether the normalized rotation fluctuation amount Δωn is reduced by limiting the ignition retardation or by limiting the correction requirement value α. For this reason, in the present embodiment, the retardation limiting coefficient Ks is set to a smaller value when the normalized rotation fluctuation amount Δωn is great after limiting the dither control than when the normalized rotation fluctuation amount Δωn is small to limit the ignition retardation. Thus, even if there is a tendency that the temperature of the three-way catalyst 24 is easily increased due to the increase in the normalized rotation fluctuation amount Δωn at the same time as when the exhaust temperature is increased by retardation of the ignition timing, the temperature of the three-way catalyst 24 is inhibited from being excessively increased.

(2) If the rich learning value Lr or the lean learning value L1 is greater than or equal to the predetermined value, the CPU 32 sets the retardation limiting coefficient Ks to 0 and sets the ignition timing SA to the base ignition timing SAbase without correcting the base ignition timing SAbase using the requested retardation amount ΔSA. Thus, even if there is a tendency that the temperature of the three-way catalyst 24 is easily increased due to an imbalance anomaly at the same time as when the exhaust temperature is increased due to retardation of the ignition timing, the temperature of the three-way catalyst 24 is inhibited from being excessively increased.

(3) The changing speed of changing the dither second correction coefficient Kdm to a great value is lower than the changing speed of changing the dither second correction coefficient Kdm to a small value. Thus, if, for example, a misfire occurs, the increase in the temperature of the three-way catalyst 24 is inhibited by promptly reducing the correction requirement value α, and when the internal combustion engine 10 is restored from, for example, a misfire, the shaft torque of the internal combustion engine 10 is inhibited from being rapidly changed due to abruptly increasing the correction requirement value α.

(4) The changing speed of changing the ignition second correction coefficient Ksm to a great value is lower than the changing speed of changing the ignition second correction coefficient Ksm to a small value. Thus, if, for example, a misfire occurs, the exhaust temperature is decreased by promptly reducing the retardation amount of the ignition timing, and when the internal combustion engine 10 is restored from, for example, a misfire, the combustion state is inhibited from being rapidly changed due to abruptly retarding the ignition timing.

<Correspondence>

The correspondence between the items in the above embodiments and the items described in the above SUMMARY is as follows. Below, the correspondence is shown for each of the numbers in the examples described in the above SUMMARY.

[1] In Example 1, the exhaust purification device corresponds to the three-way catalyst 24, and the dither control process corresponds to the correction coefficient calculating process M24, the dither correcting process M26, the multiplication process M28, the correction coefficient calculating process M30, the dither correcting process M32, and the injection amount controlling process M34 in a case in which the correction requirement value α is greater than zero. The first limit requesting process corresponds to the processes of S10 to S16, and the second limit requesting process corresponds to the processes of S18 to S26. The limiting process corresponds to the process of S28 and the dither limiting process M22.

Since the correction requirement value α is updated using a value obtained by multiplying the correction requirement value α by the dither limiting coefficient Kd, limiting the dither control process to decrease the absolute value of the difference between the air-fuel ratios of the cylinders corresponds to decreasing the dither limiting coefficient Kd.

[2] In example 2, the advancing process corresponds to the processes of S48 to S58 and the retardation limiting process M44, and the adjustment process corresponds to the process of S47.

To reduce the retardation limiting coefficient Ks means to limit the retardation process, that is, to increase the advancing process.

[4] Example 4 corresponds to the processes of S40 to S46.

[5] Example 5 corresponds to the process of FIG. 6.

<Other Embodiments>

The above-described embodiment and the following modifications can be combined as long as the combined modifications remain technically consistent with each other.

Regarding First Limit Requesting Process

In the above-described embodiment, the dither first correction coefficient Kdi is set based on the rich learning value Lr and the lean learning value L1, but the configuration is not limited to this. For example, as will be described below in the section of Regarding Imbalance Learning Process, when the rich imbalance and the lean imbalance are quantified by the same learning value, the dither first correction coefficient Kdi only needs to be calculated based on that single learning value.

In the above-described embodiment, the value of the dither first correction coefficient Kdi is set to 1 or 0, but the configuration is not limited to this. For example, the value of the dither first correction coefficient Kdi may take any value greater than or equal to 0 and less than or equal to 1, and the dither first correction coefficient Kdi may be set to a smaller value when the degree of imbalance is great than when the degree of imbalance is small.

Regarding Second Limit Requesting Process

In the above-described embodiment, the dither second correction coefficient Kdm takes any value greater than or equal to 0 and less than or equal to 1, but the configuration is not limited to this. For example, the dither second correction coefficient Kdm calculated through the process of S20 may be either 0 or 1.

It is not essential to include the gradual change process of S22.

Regarding Advancing Process

In the above-described embodiment, the ignition first correction coefficient Ksi is set based on the rich learning value Lr and the lean learning value L1, but the configuration is not limited to this. For example, as described in the section of Regarding Imbalance Learning Process, when the rich imbalance and the lean imbalance are quantified by the same learning value, the ignition first correction coefficient Ksi only needs to be calculated based on that single learning value.

In the above-described embodiment, the value of the ignition first correction coefficient Ksi is set to 1 or 0, but the configuration is not limited to this. For example, the ignition first correction coefficient Ksi may take any value greater than or equal to 0 and less than or equal to 1, and the ignition first correction coefficient Ksi may be set to a smaller value when the degree of imbalance is great than when the degree of imbalance is small.

As will be described in the following section Regarding Setting of Ignition Timing, when the amount corresponding to the above-described ignition timing SA obtained by correcting the base ignition timing SAbase using the requested retardation amount ΔSA is directly calculated based on the operating point of the internal combustion engine 10, the correction amount that corrects the ignition timing SA to advance only needs to be calculated instead of the ignition first correction coefficient Ksi. In this case, the rotational speed NE and the load factor KL are desirably used to calculate the correction amount in addition to the rich learning value Lr and the lean learning value L1.

In the above-described embodiment, the ignition second correction coefficient Ksm takes any value greater than or equal to 0 and less than or equal to 1, but the configuration is not limited to this. For example, the ignition second correction coefficient Ksm calculated through the process of S50 may be either 0 or 1.

As will be described in the following section Regarding Setting of Ignition Timing, when the amount corresponding to the above-described ignition timing SA obtained by correcting the base ignition timing SAbase using the requested retardation amount ΔSA is directly calculated based on the operating point of the internal combustion engine 10, the correction amount that corrects the ignition timing SA to advance only needs to be calculated instead of the ignition second correction coefficient Ksm. In this case, the rotational speed NE and the load factor KL are desirably used to calculate the correction amount in addition to the rotation fluctuation amount Δω.

It is not essential to include the gradual change process of S52.

Regarding Limiting Process

As described in the section of Regarding Advancing Process, when the correction amount for correcting the ignition timing SA to advance is calculated instead of the ignition first correction coefficient Ksi and the ignition second correction coefficient Ksm, the greater one of the correction amount based on the imbalance learning value and the correction amount based on the normalized rotation fluctuation amount Δωn only needs to be used.

Regarding Adjustment Process

In the above-described embodiment, the threshold value αth is set to be less than the minimum value that is greater than zero among the correction requirement values set by the requirement value outputting process M20 and is not limited to be greater than the minimum value. However, for example, the threshold value αth may be a value for determining that the dither control is not being executed.

Regarding Imbalance Learning Process

The learning process of learning the rich learning value Lr is not limited to the one illustrated in the above-described embodiment. For example, when the difference between the maximum value and the minimum value of the upstream air-fuel ratio Afu is great, the degree of the rich imbalance is presumed to be greater than that when the difference is small, and the rich learning value Lr may be calculated. The learning process of learning the rich learning value Lr is not limited to the one that uses the upstream air-fuel ratio Afu. For example, when the downstream air-fuel ratio Afd is richer than the target air-fuel ratio, and the deviation is great, the degree of the rich imbalance is presumed to be greater than that when the deviation is small, and the rich learning value Lr may be calculated.

The learning process of learning the lean learning value L1 is not limited to the one illustrated in the above-described embodiment. For example, the rotational angle region used to calculate the instantaneous speed ω1 does not necessarily have to include the TDC. Furthermore, for example, the speed is not limited to the speed in the rotational angle region of 30° CA, but may be, for example, the speed in the rotational angle region of 60° CA. However, the period of time in which the rotation speed of the crankshaft becomes the maximum due to the combustion stroke of each cylinder is desirably included. Furthermore, for example, when the downstream air-fuel ratio Afd is leaner than the target air-fuel ratio, and the deviation is great, the degree of the lean imbalance is presumed to be greater than that when the deviation is small, and the lean learning value L1 may be calculated.

The rich learning value Lr and the lean learning value L1 do not necessarily have to be learned separately. For example, when the downstream air-fuel ratio Afd is leaner than the target air-fuel ratio, and the deviation is great, the degree of the lean or rich imbalance is presumed to be greater than that when the deviation is small, and the degree of the imbalance may be learned.

The imbalance learning process does not necessarily have to use the value of the air-fuel ratio sensor or the instantaneous speed ω1. For example, each of the cylinders #1 to #4 may include a cylinder pressure sensor, and the imbalance learning process may include calculating the rate of heat release based on detection values from the cylinder pressure sensors, estimating the injection amount based on the rate of heat release, and quantifying the degree of variation of the estimated injection amount.

Regarding Requested Retardation Amount Setting Process

In the above-described embodiment, the requested retardation amount ΔSA is set based on the target value Af*, the rotation speed NE, and the load factor KL, but the configuration is not limited to this. For example, the air-fuel ratio Af may be used instead of the target value Af*. Alternatively, for example, the load may be the amount of air that fills the combustion chamber 16. Alternatively, for example, instead of the load, which is the load factor KL in this embodiment, the operation amount for controlling the air-fuel ratio to be the target air-fuel ratio, which is the injection amount of the fuel injection valve 18 in this embodiment, may be used. Alternatively, for example, the requested retardation amount ΔSA may be set based on the rotation speed NE and the load, and not the air-fuel ratio.

In the above-described embodiment, the requested retardation amount ΔSA is used to inhibit the vibration and noise of a vehicle, but the configuration is not limited to this. For example, the requested retardation amount may be for warming up the three-way catalyst 24.

Regarding Setting of Ignition Timing

In the above-described embodiment, the base ignition timing SAbase is set based on the target value Af*, the rotation speed NE, and the load factor KL, but the configuration is not limited to this. For example, the air-fuel ratio Af may be used instead of the target value Af*. Alternatively, for example, the load may be the amount of air that fills the combustion chamber 16. Alternatively, for example, instead of the load, which is the load factor KL in this embodiment, the operation amount for controlling the air-fuel ratio to be the target air-fuel ratio, which is the injection amount of the fuel injection valve 18 in this embodiment, may be used. Alternatively, for example, the base ignition timing SAbase may be set based on the rotation speed NE and the load, and not the air-fuel ratio.

In the above-described embodiment, the base ignition timing SAbase is corrected using the requested retardation amount ΔSA to determine the ignition timing SA, but the configuration is not limited to this. For example, the ignition timing SA obtained by correcting the above-described base ignition timing SAbase using requested retardation amount ΔSA may be directly calculated based on the operating point defined by the load such as the load factor KL and the rotation speed NE. The process is executed by, for example, storing map data that uses the rotation speed NE and the load as the input variable and the ignition timing SA as the output variable in the ROM 34 and allowing the CPU 32 to perform map computation of the ignition timing SA. The process that directly calculates the ignition timing SA based on the operating point is not limited to the process that calculates the ignition timing SA based only on the operating point, but may be, for example, a process that calculates the ignition timing SA based on the operating point and the coolant temperature THW.

Regarding Torque Fluctuation Amount

In the above-described embodiment, the torque fluctuation amount is quantified by the normalized rotation fluctuation amount Δωn, but the configuration is not limited to this. For example, each of the cylinders #1 to #4 may include a cylinder pressure sensor that detects the pressure in the associated combustion chamber 16. The rate of heat release of each cylinder may be calculated based on time-series data of the detection values from the associated cylinder pressure sensor. The torque may be calculated based on the rate of heat release to calculate the torque fluctuation amount that quantifies the difference between the torques ascribable to the combustion strokes of the cylinders #1 to #4.

Regarding Dither Control Process

In the above-described embodiment, the correction requirement value α is calculated in accordance with the rotational speed NE and the load factor KL, but the configuration is not limited to this. For example, a value variably set in accordance with the coolant temperature THW with the basic value α0 set as the upper limit may be multiplied by the correction coefficient variably set in accordance with the rotational speed NE and the load factor KL, and the correction requirement value α may be set to the product.

Furthermore, for example, the correction requirement value α may be variably set based only on the rotational speed NE and the coolant temperature THW, or the correction requirement value α may be variably set based only on the load factor KL and the coolant temperature THW among three parameters including the rotational speed NE, the load factor KL, and the coolant temperature THW. Furthermore, the correction requirement value α may be variably set based on one of the parameters including the rotational speed NE, the load factor KL, and the coolant temperature THW. In the above-described embodiment, the rotational speed NE and the load factor KL are used as parameters for determining the operating point of the internal combustion engine 10. For example, instead of the load factor KL, which is a load, the accelerator operation amount, which is a load, may be used to determine the operating point. Alternatively, the correction requirement value α may be variably set in accordance with the intake air amount Ga instead of the rotational speed NE.

It is not essential to variably set the correction requirement value α with a value that is greater than 0 based on the operating point of the internal combustion engine 10. For example, a single value that is greater than zero may be set for the warm-up process of the three-way catalyst 24, and a single value that is greater than zero may be set for the sulfur release process of the three-way catalyst 24.

In the above-described embodiment, the number of the lean combustion cylinders is greater than the number of the rich combustion cylinder, but the configuration is not limited to this. For example, the number of the rich combustion cylinders and the number of the lean combustion cylinders may be equal to each other. Alternatively, instead of setting all the cylinders #1 to #4 to either a lean combustion cylinder or a rich combustion cylinder, the air-fuel ratio of one cylinder may be set to the target air-fuel ratio. Furthermore, if the cylinder filling air amount remains constant in one combustion cycle, the reciprocal of the mean value of the fuel-air ratios does not need to be the target air-fuel ratio. For example, in the case of four cylinders as in the above-described embodiment, if the cylinder filling air amount remains constant, the reciprocal of the mean value of the fuel-air ratios at five strokes may be used as the target air-fuel ratio. Also, the reciprocal of the mean value of the fuel-air ratios at three strokes may be used as the target air-fuel ratio. However, it is desirable that a period in which both a rich combustion cylinder and a lean combustion cylinder exist in a single combustion cycle occur at least once every two combustion cycles. In other words, if the cylinder filling air amount remains constant for a predetermined period, it is desirable to set the predetermined period to two or fewer combustion cycles when setting target air-fuel ratio to the reciprocal of the mean value of the fuel-air ratios. For example, if the predetermined period is set to two combustion cycles and the rich combustion cylinder exists only once during two combustion cycles, the appearance order of the rich combustion cylinder and the rich combustion cylinder is represented by R, L, L, L, L, L, L, L, where the lean combustion cylinder is represented by R, and the lean combustion cylinder is represented by L. In this case, a period of one combustion cycle that is shorter than the predetermined period and represented by R, L, L, L is provided, and part of cylinders #1 to #4 is a lean combustion cylinder and the other cylinders are rich combustion cylinders. When the reciprocal of the mean value of the fuel-air ratios of periods different from one combustion cycle is used as the target air-fuel ratio, it is desirable that the amount of air that is drawn into the internal combustion engine in the intake stroke and is blown back to the intake passage before the intake valve closes be negligible.

Regarding Exhaust Purification Device

In the above-described configuration, the three-way catalyst 24 is presented as the exhaust gas purification device, but the configuration is not limited to this. For example, a gasoline particulate filter (GPF) may be provided downstream of the three-way catalyst 24. Alternatively, only a GPF may be provided. In this case, however, it is desirable to impart the oxygen storage capacity to the GPF in order to improve the temperature increasing effect by the dither control.

Regarding Warm-Up Requirement of Exhaust

The temperature increase requirement is not limited to the one in the above-described embodiment. For example, in a configuration equipped with a GPF as in the section Regarding Exhaust Purification Device, a temperature increase requirement may arise in order to burn the particulate matter in the GPF. When a GPF is provided downstream of the three-way catalyst 24, unburnt fuel discharged from the rich combustion cylinder and the oxygen discharged from the lean combustion cylinders may be reacted with each other in the three-way catalyst 24, and the heat of reaction may be used to raise the exhaust temperature downstream of the three-way catalyst 24, so that the GPF is heated. Further, for example, a temperature increase requirement of the exhaust gas by the dither control may arise in order to raise the temperature of the exhaust passage 22 so as to suppress collection of condensed water onto the exhaust passage 22.

Regarding Controller

The controller is not limited to a device that includes the CPU 32 and the ROM 34 and executes software processing. For example, at least part of the processes executed by the software in the above-described embodiment may be executed by hardware circuits dedicated to executing these processes (such as ASIC). That is, the controller may be modified as long as it has any one of the following configurations (a) to (c). (a) A configuration including a processor that executes all of the above-described processes according to programs and a program storage device such as a ROM (including a non-transitory computer readable medium) that stores the programs. (b) A configuration including a processor and a program storage device that execute part of the above-described processes according to the programs and a dedicated hardware circuit that executes the remaining processes. (c) A configuration including a dedicated hardware circuit that executes all of the above-described processes. A plurality of software processing circuits each including a processor and a program storage device and a plurality of dedicated hardware circuits may be provided. That is, the above processes may be executed in any manner as long as the processes are executed by processing circuitry that includes at least one of a set of one or more software processing circuits and a set of one or more dedicated hardware circuits.

Regarding Internal Combustion Engine

The internal combustion engine is not limited to a four-cylinder engine. For example, an in-line six-cylinder engine may be used. The fuel injection valve is not limited to one that injects fuel into the combustion chamber 16, but may be one that injects fuel, for example, into the intake passage 12.

The invention claimed is:

1. A controller for an internal combustion engine, wherein the internal combustion engine includes an exhaust purifying device, which purifies exhaust gas discharged from a plurality of cylinders, and fuel injection valves provided for the respective cylinders, and the controller being configured to execute
   a dither control process of operating the fuel injection valves in such a manner that at least one of the cylinders is designated as a rich combustion cylinder and at least another one of the cylinders is designated as a lean combustion cylinder, an air-fuel ratio of the rich combustion cylinder being richer than a stoichiometric air-fuel ratio, and an air-fuel ratio of the lean combustion cylinder being leaner than a stoichiometric air-fuel ratio,
   a first limit requesting process of, in a case in which the fuel injection valves are operated to control air-fuel ratios of the respective cylinders to be equal to each other, requesting to limit the dither control process in such a manner that an absolute value of a difference between the air-fuel ratios of the cylinders is when a degree of variation of the injection amounts of the fuel injection valves of the respective cylinders is great than when the degree of variation is small,
   a second limit requesting process of requesting to limit the dither control process in such a manner that the absolute value is smaller when a torque fluctuation amount of the internal combustion engine is great than when the torque fluctuation amount is small, and
   a limiting process of limiting the dither control process in such a manner that the absolute value decreases in accordance with one of requests generated by the first limit requesting process and the second limit requesting process that causes the absolute value to be smaller than the other.

2. The controller for an internal combustion engine according to claim 1, wherein the controller is further configured to execute
   an advancing process of advancing an ignition timing more when the torque fluctuation amount of the internal combustion engine is great than when the torque fluctuation amount is small, and
   an adjustment process of executing the limiting process prior to the execution of the advancing process when the torque fluctuation amount increases during execution of the dither control process.

3. The controller for an internal combustion engine according to claim 2, wherein
   the controller is further configured to execute a retardation requirement amount setting process of setting a requested retardation amount of the ignition timing in accordance with a rotational speed and a load of a crankshaft of the internal combustion engine, and
   the advancing process corrects the requested retardation amount to decrease in accordance with the torque fluctuation amount.

4. The controller for an internal combustion engine according to claim 2, wherein the advancing process includes a process of advancing the ignition timing more when the degree of variation is great than when the degree of variation is small.

5. The controller for an internal combustion engine according to claim 2, wherein the second limit requesting process includes a process of causing a changing speed of a request for the absolute value in response to a case in which the torque fluctuation amount is changed from a great value to a small value to be lower than a changing speed of a request for the absolute value in response to a case in which the torque fluctuation amount is changed from a small value to a great value.

6. A control method for an internal combustion engine, wherein the internal combustion engine includes an exhaust purifying device, which purifies exhaust gas discharged from a plurality of cylinders, and fuel injection valves provided for the respective cylinders, the control method comprising:
   a dither control process of operating the fuel injection valves in such a manner that at least one of the cylinders is designated as a rich combustion cylinder and at least another one of the cylinders is designated as a lean combustion cylinder, an air-fuel ratio of the rich combustion cylinder being richer than a stoichiometric air-fuel ratio, and an air-fuel ratio of the lean combustion cylinder being leaner than a stoichiometric air-fuel ratio;
   a first limit requesting process of, in a case in which the fuel injection valves are operated to control air-fuel ratios of the respective cylinders to be equal to each other, requesting to limit the dither control process in such a manner that an absolute value of a difference between the air-fuel ratios of the cylinders is when a degree of variation of the injection amounts of the fuel injection valves of the respective cylinders is great than when the degree of variation is small;
   a second limit requesting process of requesting to limit the dither control process in such a manner that the absolute value is smaller when a torque fluctuation amount of the internal combustion engine is great than when the torque fluctuation amount is small; and a limiting process of limiting the dither control process in such a manner that the absolute value decreases in accordance with one of requests generated by the first limit requesting process and the second limit requesting process that causes the absolute value to be smaller than the other.

7. A non-transitory computer readable medium that stores a program for causing a processor to execute a control process for an internal combustion engine, wherein the internal combustion engine includes an exhaust purifying device, which purifies exhaust gas discharged from a plurality of cylinders, and fuel injection valves provided for the respective cylinders, the control process includes a dither control process of operating the fuel injection valves in such a manner that at least one of the cylinders is designated as a rich combustion cylinder and at least another one of the cylinders is designated as a lean combustion cylinder, an air-fuel ratio of the rich combustion cylinder being richer than a stoichiometric air-fuel ratio, and an air-fuel ratio of the lean combustion cylinder being leaner than a stoichiometric air-fuel ratio, a first limit requesting process of, in a case in which the fuel injection valves are operated to control air-fuel ratios of the respective cylinders to be equal to each other, requesting to limit the dither control process in such a manner that an absolute value of a difference between the air-fuel ratios of the cylinders is when a degree of variation of the injection amounts of the fuel injection valves of the respective cylinders is great than when the degree of variation is small, a second limit requesting process of requesting to limit the dither control process in such a manner that the absolute value is smaller when a torque fluctuation amount of the internal combustion engine is great than when the torque fluctuation amount is small, and a limiting process of limiting the dither control process in such a manner that the absolute value decreases in accordance with one of requests generated by the first limit requesting process and the second limit requesting process that causes the absolute value to be smaller than the other.

\* \* \* \* \*